OR  3,796,476

United States Patent
Frosch et al.

[11] 3,796,476
[45] Mar. 12, 1974

[54] METHOD OF MAKING TOTALLY INTERNALLY REFLECTED HOLOGRAMS

[75] Inventors: Albert Frosch; Walter Jaerisch; Arno Schmackpfeffer, all of Boeblingen; Joerg Ziller, Ehningen, all of Germany

[73] Assignee: International Business Machines Corporation, Armonk, N.Y.

[22] Filed: July 27, 1972

[21] Appl. No.: 275,591

[30] Foreign Application Priority Data
Aug. 12, 1971 Germany............................ 2140408

[52] U.S. Cl. ................................................. 350/3.5
[51] Int. Cl. ........................................... G02b 27/00
[58] Field of Search ...................................... 350/3.5

[56] References Cited
OTHER PUBLICATIONS

Stetson, "Applied Physics Letters," Vol. 12, No. 11, June 1968, pp. 362-364.
Nassimbene et al., "IBM Technical Disclosure Bulletin," Vol. 8, No. 10, Mar. 1966, p. 1396.

Primary Examiner—Ronald J. Stern
Attorney, Agent, or Firm—John J. Goodwin; George Baron

[57] ABSTRACT

A method is described for making holograms by means of linearly polarized object and reference beams, the reference beam being reflected inside the photosensitive emulsion. The plane of polarization of a linearly polarized reference beam includes an angle of 45° with its plane of incidence. The beam is reflected under the critical angle of total internal reflection at the lower face of a photographic emulsion. The reflected beam is linearly polarized, too, its plane of polarization being turned by 90°, so that no interference between these two beams is possible. An object beam passes a mask and is linearly polarized vertically either to the reference beam or to the reflected beam so that only one hologram can be formed and no undesired interaction between two holograms is possible when the mask is reproduced for exposure of a photoresist-covered semiconductor wafer.

2 Claims, 6 Drawing Figures

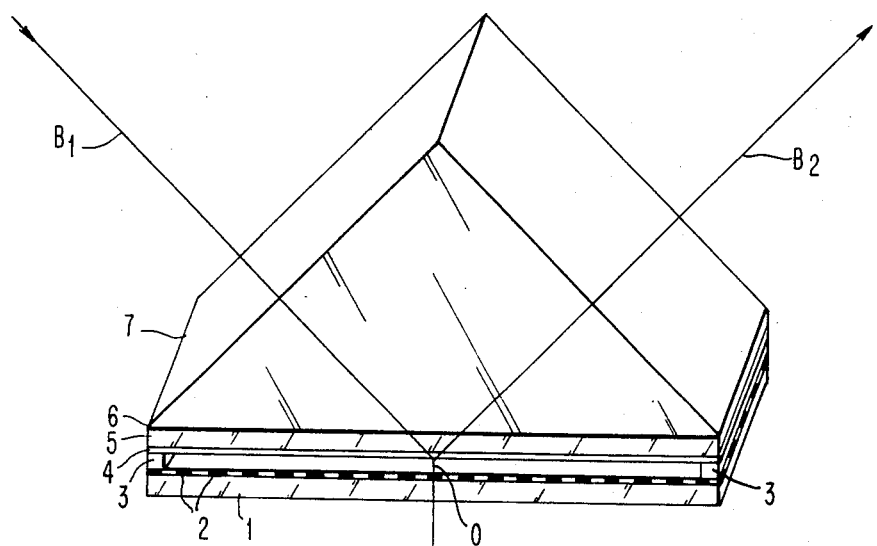
PRIOR ART FIG. 1
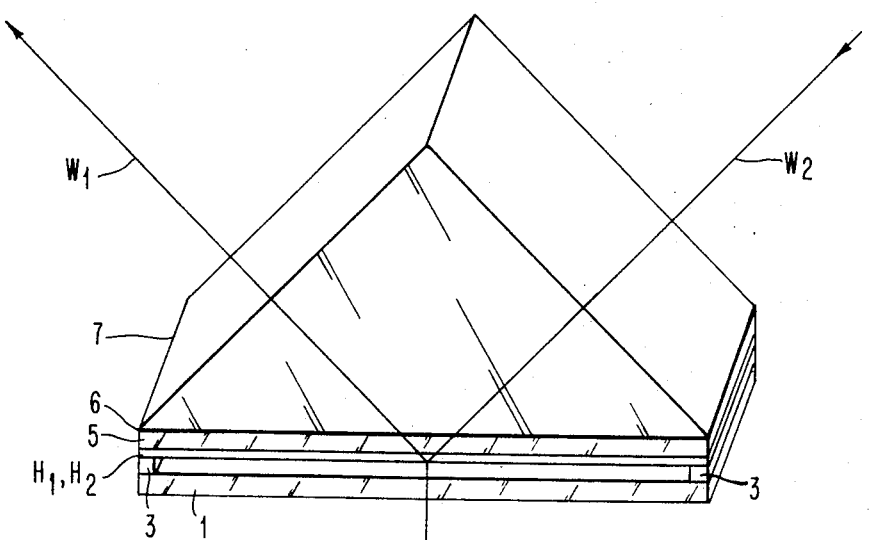
PRIOR ART FIG. 2

METHOD OF MAKING TOTALLY INTERNALLY REFLECTED HOLOGRAMS

BACKGROUND OF THE INVENTION

In many holography applications, the holographically reproduced image is used for the exposure of a photographic emulsion. As holographic reproduction always supplies several images placed in different directions, the photographic emulsion to be exposed has always to be arranged at a relatively long distance from the hologram so that the unwanted holographic images are outside the range of the emulsion to be exposed. On the other hand, only a predetermined percentage of the radiation used for the reproduction of the hologram is converted into holographic images, while the rest leaves, as radiation without informative contents, the hologram in a predetermined direction. For that reason, too, with the methods used heretofore, the distance between hologram and photosensitive emulsion has to be large. The relatively large distance between the record carriers and the emulsion to be exposed deteriorates the resolution of the transferred image. This fact represents a considerable disadvantage in the transfer of very finely structured patterns, for instance when making integrated circuits. It is a well-known fact that in the production of integrated circuits very finely structured lines are transferred onto photoresist-covered silicon wafers, the line widths being in the order of 1 micrometer. The photoresist layers are exposed either by projection printing, contact printing, proximity printing where the distance between mask and photosensitive layer is in the order of 10 micrometers approximately, or by means of holographic printing processes. In the holographic processes, the so-called total reflexion holography has proved particularly advantageous.

In the projection printing method where a mask is imaged with an objective on the photoresist layer coating the semiconductor chip the disadvantage is that the resolution decreases with increasing image field diameter. In the transfer with a distance of approximately 10 micrometers between mask and photosensitive layer so-called ghost lines are observed, upon increasing air gap diameter and decreasing line diameter, said ghost images being due to interference between the radiations intruding through adjacent gaps. In total reflexion holography, fields of discretionary size can be transferred with a theoretical resolution of approximately 0.5 micrometers line width without the size of the air gap playing an important part. The essential advantage of this method as compared with the standard holographic processes lies in the fact that in case of large fields (for instance several centimeters), very small distances, for instance 50–100 micrometers, are possible between semiconductor chip and hologram without several images, or the part of the reproducing beam which had not been converted into images, reaching the emulsion to be exposed. In the ideal case, with the total reflexion holography process, two fully congruent images are provided by the reconstruction of such a hologram, since by the exposure a first hologram is generated by the incident beam, and a second hologram by the totally reflected reference beam. The practically obtainable resolution in the total reflexion holography process is limited by the fact that the two images generated by the reproduction are shifted relative to each other owing to the shrinkage of the emulsion.

SUMMARY OF THE INVENTION

It is an object of the present invention to provide a simple process for exposing emulsions, particularly photoresists, when making integrated circuits.

According to the invention, this problem is solved by a method for making holograms by means of linearly polarized reference and object beams and a reference beam totally reflected inside the photosensitive emulsion, said process being characterized in that the plane of polarization of the reference beam includes an angle of 45° with the plane of incidence, and in that the plane of polarization of the object beam is parallel or vertical to the plane of polarization of the incident reference beam.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 1 and 2 are schematic representations for demonstrating the recording and reproducing in the prior art total reflexion holograms.

DESCRIPTION OF THE PREFERRED EMBODIMENTS

Figure 3:
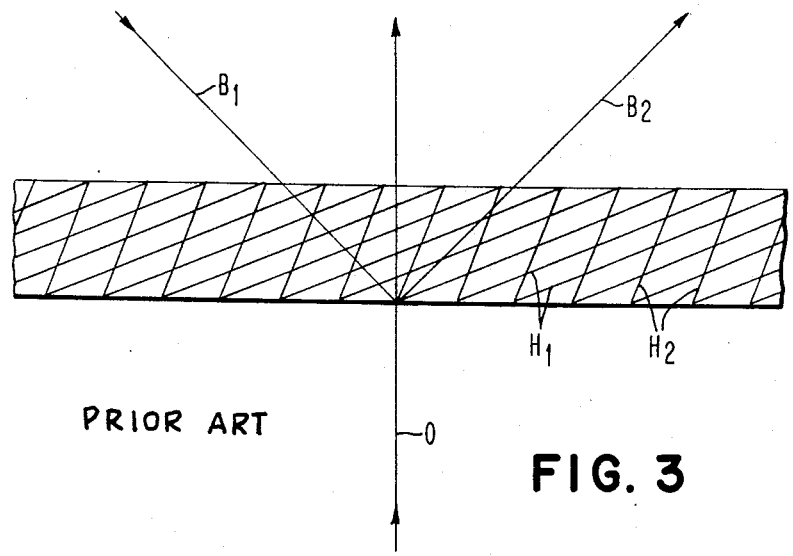
FIGS. 3 and 4 is a schematic representation of the beam direction upon the recording and reproducing of known total reflexion holograms.

In the arrangement of FIG. 1, a mask 2 is arranged on a glass carrier 1. On mask 2, there are spacers 3 which have the function of keeping an emulsion 4 on a glass carrier 5 at a predetermined distance from mask 3. The upper surface of glass carrier 5 is covered with a thin lubricating film 6 against which rests the hypotenuse surface of a rectangular triangle prism 7 made of glass. For photographing such a hologram, mask 2 is illuminated from below by means of a vertically impinging, parallel and coherent radiation which, after having passed through the mask, represents object beam 0. Reference beam $B_1$ is formed by a radiation $B_1$ impinging from the right onto a cathetus surface of prism 7, said radiation, under the angle of total reflexion, impinging on the boundary layer of photosensitive emulsion 4 against air and being there fully reflected as a second reference beam $B_2$.

Figure 4:
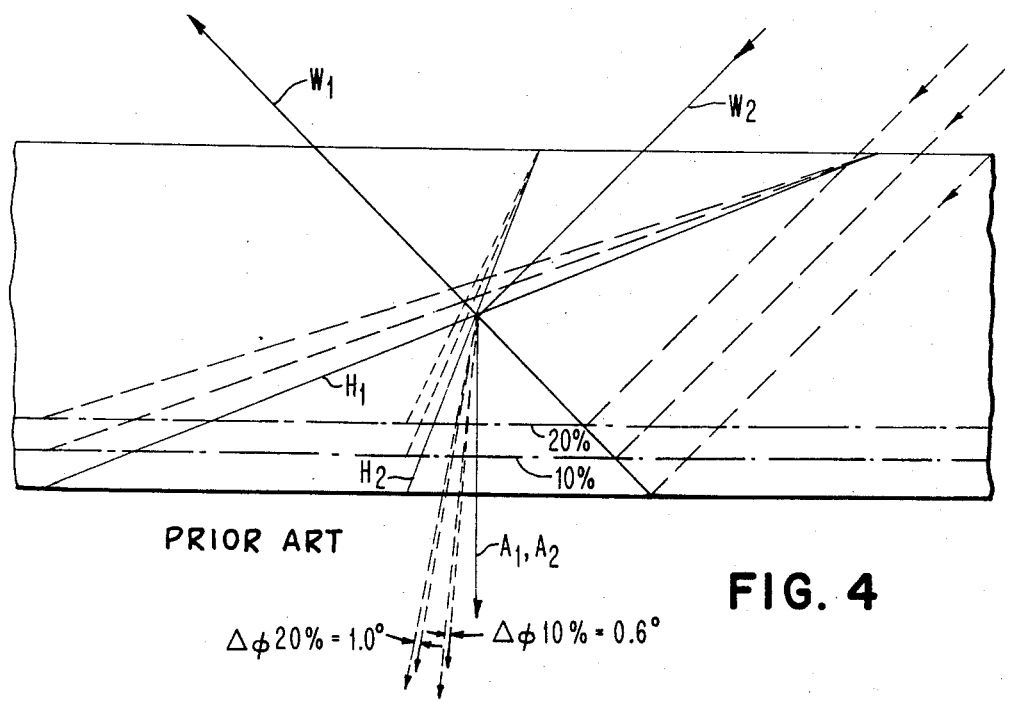

Through the interference of the object beam 0 and the reference beam $B_1$ an interference pattern is formed in a conventional manner, said pattern being recorded in the photosensitive emulsion 4 as a hologram. At the same time, and owing to the interference of object beam 0 and reference beam $B_2$ totally reflected at the lower borderline of photosensitive emulsion 4, a second interference pattern is formed which is equally recorded as a hologram in photosensitive emulsion 4. The two holograms are fully superimposed. The two holograms involved are a Lippmann hologram $H_1$ and a transmission hologram $H_2$. For reproducing the holographically recorded mask a reproducing beam $W_2$, as shown in FIG. 2, is directed from the right vertically on a cathetus surface of prism 7, said beam being fully reflected, as a second reproducing beam $W_1$, at the borderline between emulsion 4 and the air layer beneath it. FIG. 3 shows the orientation of the interference gratings of both holograms, recorded in a thick photosensitive emulsion (having a layer thickness much greater than the length of light wave). The grating direction in the undeveloped emulsion corresponds to the angle bisector between the interfering beams. It is a known fact that the photographic development process causes shrinkage of the emulsion. As this shrinkage does not take place with full uniformity in the entire photosensitive emulsion it causes, as shown in FIG. 4, a strong local change of the grating orientation of holograms $H_1$ and $H_2$. The effect of this change of the grating orientation is a lateral shifting of the reconstructed images $A_1$ and $A_2$ (FIG. 4).

FIG. 4 shows a special case of reproduction beams $W_1$ and $W_2$ incident at an angle of 45°, and for shrinkages of the emulsion by 10 or 20 percent, respectively, of the thickness. With a typical distance of 100 micrometers between hologram and the photoresist to be exposed the relative shift of images $A_1$ and $A_2$ is 1.0 micrometer and 1.8 micrometer, respectively. Owing to this image shift, it is not possible to transfer, with the known total reflexion method, structures of 1 micrometer approximately onto the photoresist covering the semiconductor chip, because of the simultaneous existence of both images. In the publication by K. A. Stetson, "An Analysis of the Properties of TIR Holograms," Optik 29, 5 (1969), pp. 520–536, a cancelling of the emulsion shrinkage ("reswelling") to the former value is suggested, so as to ensure that the two reconstructed images are spatially congruent. It is, however, known that the cancelling of the shrinkage by means of controlled swelling of an emulsion is a process which is highly complicated to reproduce and influenced by many parameters. In spite of swelling, the images will therefore always contain geometric errors and interferences.

Figure 5:
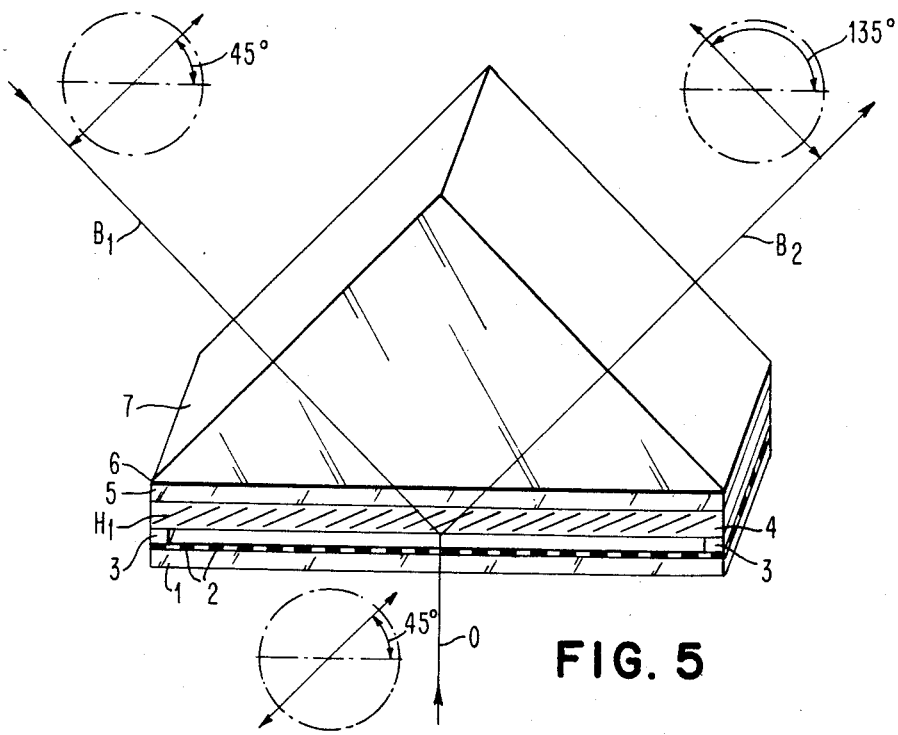
FIGS. 5 and 6 are schematic representations for demonstrating the inventive process.
Figure 6:
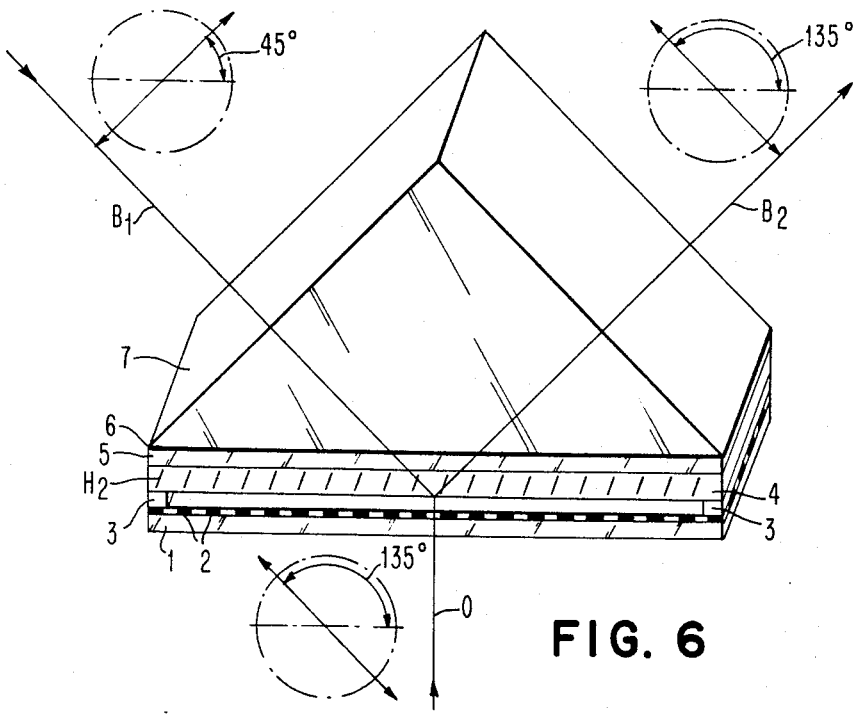

FIGS. 5 and 6 present the inventive method avoiding the above-mentioned difficulties. Reference beam $B_1$ impinging a cathetus surface of prism 7 from the left is linearly polarized in a direction which with the plane of incidence includes an angle of 45°. In the total reflexion at the lower surface of photosensitive emulsion 4, provided the beam impinges under the critical angle of total reflexion, the plane of polarization of beam $B_1$ is turned by 90°, so that with the plane of incidence the fully reflected beam $B_2$ includes an angle of 135°. Object beam 0 which impinges from below, for example, vertically on photosensitive emulsion 4 is polarized in a direction which with the plane of incidence of beam $B_1$ includes an angle of 45°, that is, which is parallel to the direction of polarization of this beam. As two beams which are vertically polarized to each other cannot interfere with each other only incident reference beam $B_1$, and object beam 0 participate in the interference pattern forming in photosensitive emulsion 4 so that only one single hologram $H_1$ is made.

It is important in this process that the reflexion takes place exactly under the critical angle of total reflexion since in case of deviations from that angle the fully reflected beam is polarized no longer linearly but elliptically. It is a well-known fact that each elliptically polarized radiation also contains components which are vertical to the longitudinal axis of the ellipse, so that a second interference pattern and thus a second, though weaker hologram is formed in the range of photosensitive layer 4.

In the modified process represented in FIG. 6, a linearly polarized reference beam $B_1$ impinges onto the left cathetus side of prism 7, the plane of polarization of said beam, similarly to the example of FIG. 5, includes an angle of 45° with the plane of incidence. A linearly polarized object beam 0 incident from below onto photosensitive emulsion 4 arranged on the hypotenuse side of prism 7 is polarized in a direction which with the plane of incidence of reference beam $B_1$ includes an angle of 135 degrees, that is, which is vertical to the plane of polarization of the incident reference beam. The plane of polarization of reference beam $B_1$ totally reflected at the lower borderline of photosensitive emulsion 4 is turned by 90°, so that with the plane of incidence it includes an angle of 135 degrees and is thus parallel to the plane of polarization of object beam 0. If the critical angle of total reflexion for incident reference beam $B_1$ is not exactly observed, which particularly for mass production is not always possible without taking special steps, even a strong ellipticity of the polarization of the totally reflected reference beam $B_2$ is no disturbing factor, apart from possible minor light losses, as the object beam linearly polarized at an angle of 135° with respect to the plane of incidence of the reference beams can form parallel interference patterns only with the components of the totally reflected beam $B_2$. The position of the plane of polarization of the incident reference beam $B_1$ can be exactly maintained without difficulties and it is entirely independent of deviations from the critical angle of total reflexion. The method represented in FIG. 6 is therefore of greater advantage for most applications as there are less parameters which have to be strictly observed.

Additionally, in the methods of FIGS. 5 and 6, the selection of the plane of polarization of reference beam $B_1$ ensures that near the bordering angle of the total reflexion — owing to the turning of the plane of polarization by 90° — no interference pattern can form between the two reference beams $B_1$ and $B_2$. Such an interference grating between reference beams $B_1$ and $B_2$ would disturb the holographic image.

It is of course equally possible, by means of a kind of cinematic reversion, to have an object beam which is linearly polarized in a suitable direction impinge on the border surface of a photosensitive emulsion, at the critical angle of total reflexion, and to direct a reference beam which is linearly polarized either vertically or in parallel thereto, onto the other side of this border surface.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of making a hologram comprising the steps of illuminating an object to produce an object beam of plane polarized light, directing a reference beam of plane polarized light towards a photosensitive emulsion so that it is totally internally reflected within said emulsion such that the reflected reference beam has a plane of polarization orthogonal to the plane of polarization of the incident reference beam, and directing the object beam at said emulsion with its plane of polarization parallel to the plane of polarization of the reflected reference beam so that interference within said emulsion occurs between the object beam and only the reflected reference beam.

2. A method of making a hologram according to claim 1 wherein said reference beam is linearly polarized at an angle of 45° with its plane of incidence.

* * * * *